United States Patent [19]

Longhetto

[11] 4,050,314
[45] Sept. 27, 1977

[54] PRESSURE GAUGE

[75] Inventor: Francesco Longhetto, Turin, Italy

[73] Assignee: Semperit Anstalt, Schaan, Liechtenstein

[21] Appl. No.: 672,269

[22] Filed: Mar. 31, 1976

[30] Foreign Application Priority Data

Apr. 4, 1975  Italy ................................. 67866/75

[51] Int. Cl.² ................................................ G01L 7/08
[52] U.S. Cl. ....................................... 73/406; 73/300; 73/396
[58] Field of Search ................ 73/300, 431, 396, 406, 73/386, 387; 116/129 A, 129 B, 129 F, 114 PV

[56] References Cited

U.S. PATENT DOCUMENTS

| 987,746 | 3/1911 | Reynolds | 73/386 |
|---|---|---|---|
| 2,986,038 | 5/1961 | Cerny | 73/300 |
| 3,016,038 | 1/1962 | Stiens | 116/129 A |

*Primary Examiner*—Donald O. Woodiel
*Attorney, Agent, or Firm*—H. Dale Palmatier

[57]  ABSTRACT

A pressure gauge having a cup-shaped case closed by a transparent cover, through which a graduated scale and a pointer movable therealong are visible, the cover being mounted rotatably on the case in an axial fixed position with respect thereto.

8 Claims, 2 Drawing Figures

PRESSURE GAUGE

BACKGROUND OF THE INVENTION

This invention relates to a pressure gauge.

In particular, the present invention relates to a pressure gauge of the type comprising a cup-shaped case closed at the front by a cover consisting at least partly of transparent material; a dial provided on the front with a graduated scale and disposed in the case so as to be visible through the cover; measuring means disposed in the case to measure a pressure to be determined; and a pointer mobile along the graduated scale under the control of the measuring means.

SUMMARY OF THE INVENTION

According to the present invention there is provided a pressure gauge of the type heretofore described, and in which the cover is mounted rotatably on the case in an axially fixed position with respect thereto. Preferably, seal means are interposed between the cover and case, these seal means being disposed in such a manner that they are directly influenced by the pressure to be measured, and being elastically deformable thereby so as to angularly lock the cover relative to the case when said pressure exceeds a certain determined value.

The aforesaid characteristic, by which the user is able to manually rotate the cover about the pressure gauge case when the pressure to be measured is less than a certain determined value, enables certain technical problems to be simply and economically solved, which would otherwise require the use of generally costly and bulky devices of low reliability, the use of which is particularly problematical when the pressure gauge has been constructed for utilization under certain environmental conditions. This is so, for example, in the case of pressure gauges used for generally measuring hydrostatic pressures, and depthometers in particular. The description given hereinafter refers to this latter particular type of pressure gauge, without however detracting from the generalities of the problems concerned, which, although being of particular importance in the construction of depthometers, are also relevant to the construction of any other type of pressure gauge.

In depthometers, one of the technical problems solved by the present invention is the calibration of the depthometer in relation to the external pressure and barometric pressure.

With regard to the external barometric pressure, depthometers generally measure not an absolute pressure, but a relative pressure equal to the absolute pressure less the atmospheric pressure. However, this latter pressure is not constant, but varies generally in accordance with two parameters, the first of which depends upon the level and the second on the atmospheric turbulence.

With regard to temperature, depthometers generally contain an element which deforms in accordance with the external pressure, and the elastic and dimensional characteristics of this deformable element are influenced by temperature.

The effect of this variability of temperature and barometric pressure is normally that the pointer of a depthometer disposed immediately below the water surface into which immersion is to take place, does not indicate zero depth, but a depth other than zero. In other words, because of the variability of barometric pressure and temperature, the measurements supplied by the depthometers are generally affected by a relatively small variable error, which leads to negligible inconvenience at large depths, but which can be important at low depths, i.e., in those depths in which the longest decomposition rests are effected. This error may be eliminated only by calibrating the depthometer before each immersion. This operation, generally impossible when known depthometers are used, is possible and easy when a depthometer constructed in accordance with the present invention is used.

In a first embodiment of the present invention, the dial is mounted rotatably about the axis of the case and in an axially fixed position with respect thereto, means being interposed between the cover and dial to make this latter angularly rigid with the cover. Preferably, said angular connection means comprise an axial eccentric appendix extending from the inner surface of the cover through a corresponding hole in the dial. Such a depthometer is calibrated for example by emerging it just under the water surface and angularly moving the cover, and therefore the dial, relative to the case and therefore relative to the pointer, so as to bring this latter to the zero position on the scale of the dial. This operation can evidently be carried out by the underwater swimmer during immersion before reaching the depth at which the cover becomes unmovable manually relative to the case, provided the underwater swimmer knows exactly the depth at which he makes the calibration.

A further problem which is solved by the present invention is the exact indication of the maximum pressure measured. With particular reference to depthometers, the present invention enables the maximum depth reached by the underwater swimmer during any immersion to be simply and exactly measured, this depth being very important for the purpose of determining the raising time, and which normally requires continuous observation of the depthometer, which is rarely done by the underwater swimmer.

The maximum pressure measured is indicated by a second embodiment of the present invention, in which a maximum indicator is supported by the cover in a position facing the dial, and this latter is supported in an axially and angularly fixed position in the case. Preferably the maximum indicator comprises a second pointer, mounted on the cover by way of friction means, so that it is mobile relative to the cover and dial along the graduated scale of this latter, means being interposed between this second pointer and the first pointer controlled by the said measuring means to determine the entrainment of the second pointer by the first, against the braking action of the friction means, only in the case of movements of the first pointer corresponding to increases in the pressure to be measured relative to the maximum pressure previously attained.

When a depthometer constructed in accordance with the second embodiment of the present invention is used, the underwater swimmer rotates the cover about the case before each immersion, so as to bring the second pointer into engagement with the first, which will evidently be in the zero position. During immersion the second pointer is displaced by the first until maximum depth is reached, and is then abandoned in this position. After the immersion, or before the next immersion, the second pointer is returned to zero by again rotating the cover about the case.

BRIEF DESCRIPTION OF THE DRAWINGS

The invention will be described by way of example with reference to the accompanying drawings, in which.

DETAILED DESCRIPTION OF THE INVENTION

Figure 1:
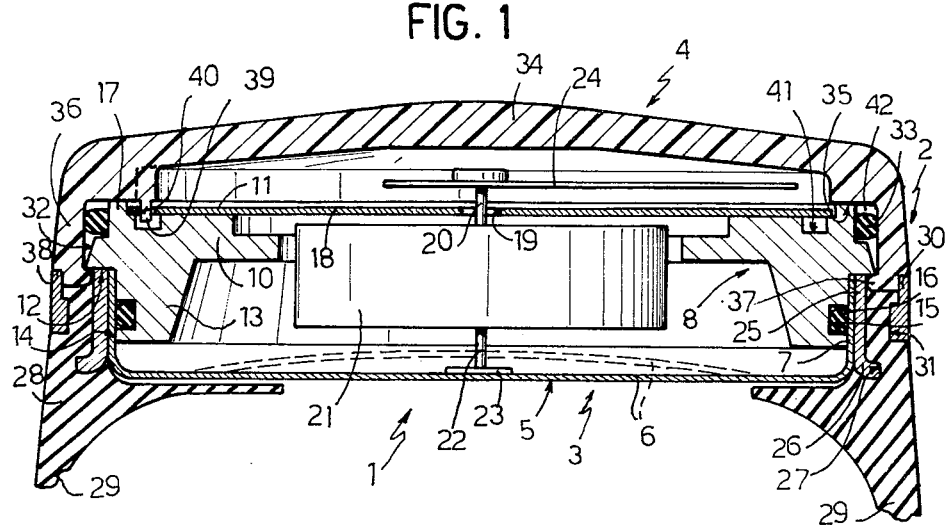
FIG. 1 is an axial section through a first embodiment of a depthometer according to the present invention.

FIG. 1 relates to a depthometer indicated overall by 1 and comprising a substantially cylindrical, waterproof outer casing 2. The casing 2 comprises a rear case 3 closed at the front by a cover 4 consisting of plastic material.

The case 3 comprises a cup member 5, preferably of sheet metal, which comprises a substantially flat end wall 6 which is relatively thin and deformable, is substantially circular in plan and is connected at its periphery to a substantially cylindrical lateral wall 7. The case also comprises an annular member 8 of rigid material, preferably metal, consisting of an annular plate 10 limited to the front by a flat annular surface 11, and to the rear by a flat annular surface 12, parallel to this latter. An axial annular appendix 13 extends from the centre of the surface 12 and has a cross-section substantially in the form of a rectangular trapezium. Externally, the appendix 13 is limited by a cylindrical surface 14 perpendicular to the surface 12 and comprising an annular groove 15, in which is housed a seal gasket 16. The appendix 13 is forcibly inserted into the cup member 5 with its surface 14 in contact with the inner surface of the lateral wall 7, so as to bring the free end of the wall 7 into contact with the surface 12. The gasket 16, compressed between the wall 7 and the bottom of the groove 15, ensures the tightness of the coupling between the members 5 and 8.

An annular axial appendix 17 extends from a position in proximity to the outer periphery of the surface 11 of the member 8, and defines, in cooperation with that part of the surface 11 which extends internally to the appendix 17, a seat for a disc 18 which simply rests on the surface 11, its thickness being less than the length of the appendix 17. A scale (not shown), generally graduated in meters or fractions of a meter, is traced on the surface of the disc 18 facing the cover 4, and extends along the periphery of the disc 18, which forms the dial of the depthometer 1. The dial 18 comprises a central through hole 19, through which extends a rotatable outlet shaft 20 of a mechanical transducer 21, the inlet of which consists of an axially mobile rod 22, kept axially in contact, by elastic means (not shown), with a plate 23 rigid with the central part of the inner surface of the end wall 6 of the cup member 5. The mechanical transducer 21 is supported by the annular member 8 and transforms the axial movements of the rod 22 into rotational movements of the shaft 20 proportional to said axial movements in accordance with a proportionality constant greater than unity. On that end of the shaft 20 projecting to the front of the dial 18 there is keyed a radial pointer 24, the free end of which is arranged to travel along the scale of the dial 18.

A rigid ring 25, preferably of metal, is forcibly mounted on the outer surface of the lateral wall 7 of the cup member, and is in contact frontwards with the annular surface 12. The ring 25 comprises at its rear a radial flange 26 engaged in an annular groove 27 in an annular member 28 preferably consisting of resilient synthetic material, and comprising at its rear two diametrically opposite axial flexible appendices 29, which form a strap for fixing the depthometer 1 to a limb of an underwater swimmer. The annular member 28 is secured to the ring 25 by a rigid outer ring 30 mounted in an annular groove 31 on the outer surface of the annular member 28 between the front end thereof and the groove 27.

The annular surface 12 projects externally to the ring 25 and is connected by a sharp corner to a lateral surface of the plate 10, which is indicated by 32 and is of cone frustum shape, tapering towards the surface 11. An annular seal gasket 33 is mounted on the outer cylindrical surface of the annular appendix 17.

The transparent cover 4 is cup-shaped and is mounted on the case 3 with its concavity facing the cup member 5. The cover 4 comprises a wall 34 facing the dial 18 and with a rear periphery 35 in the form of a flat annular surface, from the outer periphery of which extends an axial annular appendix 36, from the end of which there extends inwards a radial flange 37. The appendix 36 terminates in an annular flat surface, in the outer periphery of which there is an annular groove 38. An axial pin 39 extends from the rear surface of the wall 34, and is disposed in a position adjacent to the inner periphery of the surface 35.

The cover 4 is snap mounted on the case 3 by sliding the flange 37, the extremity of which is rounded, into contact with the cone frustum surface 32 and snapping it below the plate 10 into contact with its surface 12. In this position, the annular surface 35 rests on the end of the appendix 17 and axially fixes the dial 18, the pin 39 extending through an eccentric through hole 40 made through the dial 18 to engage in an annular groove 41 formed in the surface 11 internal to the appendix 17. The flat annular end of the appendix 36 is in contact with the front end of the annular member 28, and the groove 38 is axially engaged by a portion of the ring 30 projecting frontwards at the front end of the annular member 28.

In the assembled position, the outer periphery of the annular member 8 defines, in cooperation with part of the annular surface 35 and the inner lateral surface of the appendix 36, an annular chamber 42 which houses the seal gasket 33 slightly compressed between the inner lateral surface of the appendix 36 and the outer lateral surface of the appendix 17. The annular chamber 42 is not hermetically sealed, but is invaded by the external water during each immersion. Consequently, the water present in the chamber 42 is at the same pressure as the external water, and acts on the gasket 33 to deform it elastically and make it adhere to the lateral walls of the chamber 42 with a force which increases as the external pressure increases. At zero depth, the adherence of the gasket 33 to the lateral surfaces of the chamber 42 is such as to enable the cover 4 to be manually rotated about the case 3, while when the depth exceeds a determined value, the adherence of the gasket 33 against the lateral walls of the chamber 42 becomes such as to angularly lock the cover 4 relative to the case 3.

Because of the presence of the pin 39 and relative hole 40, a rotation of the cover 4 about the case 3 leads to an equal rotation of the dial 18 about the case 3 and about the pointer 24, this rotation being used, as previously stated, to calibrate the depthometer.

Figure 2:
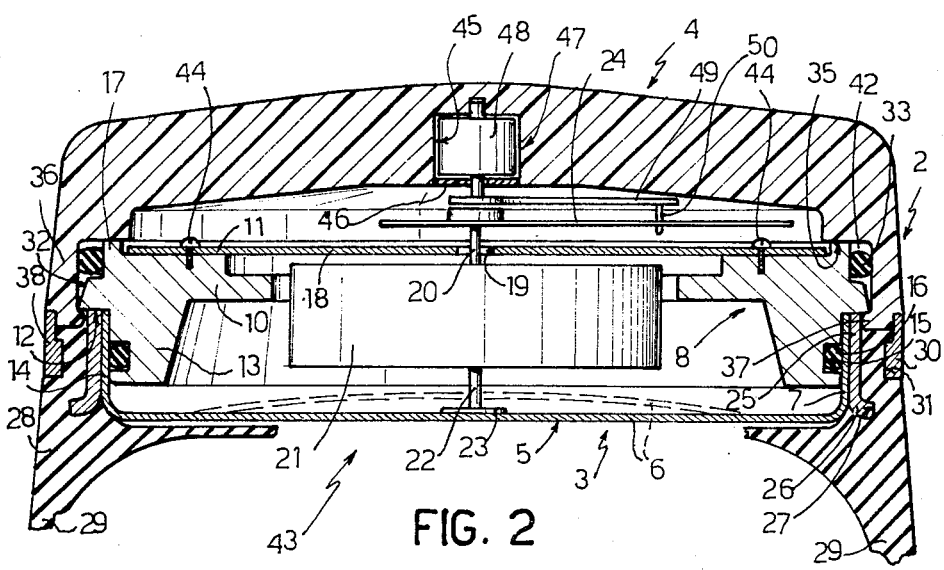
FIG. 2 is an axial section through a second embodiment of a depthometer according to the present invention.

FIG. 2 shows a depthometer 43 substantially similar to the depthometer 1, but with some modifications. In particular, the cover 4 of the depthometer 2 is without the pin 39, and the dial 18 is without the hole 40 and is fixed both axially and angularly to the surface 11 by screws 44. The wall 34 of the depthometer 43 is thinner than that of the depthometer 1, and comprises centrally a substantially cylindrical axial cavity 45 formed in the rear surface of the wall 34. The cavity 45 is closed to the rear by a ring 46 and contains a friction device 47 comprising a cylindrical drum 48 rotatably mounted in the cavity 45 by way of a high viscosity friction liquid, such as silicone oil. A radial pointer 49 provided with an appendix 50 is angularly and axially connected to the drum 48, and is arranged to engage with the pointer 24 only when this latter moves along the scale of the dial 18 as a result of increases in the external pressure.

The friction device 47, poiner 49 and relative appendix 50 form a maximum indicator device, of which the use and the method of zeroing by rotating the cover 4 about the case 3 have already been explained.

What I claim is:

1. Pressure gauge of the type comprising a cup-shaped case closed at the front by a cover consisting at least partly of transparent material; a dial provided on the front with a graduated scale and disposed in the case so as to be visible through the cover; measuring means disposed in the case to measure the pressure of the external environment; a pointer mobile along the graduated scale under the control of the measuring means; the cover being mounted rotatably on the case in an axially fixed position with respect thereto, and seal means being interposed between the cover and case; said seal means being disposed in such a manner as to be directly influenced by the pressure to be measured, and being elastically deformable by the effect thereof to angularly lock the cover relative to the case when said pressure exceeds a determined value.

2. Device as claimed in claim 1, wherein the cover is of cup configuration and comprises a lateral wall cooperating with a lateral wall of said cup to connect the cover to the case axially by snap action.

3. Device as claimed in claim 2, wherein the cover is of cup configuration and comprises a lateral wall disposed parallel to, and facing a lateral wall of the case, said facing lateral walls defining therebetween an annular chamber housing the seal means, means being provided to generate in said chamber a pressure equal to that to be measured.

4. Device as claimed in claim 3, wherein said external pressure is a hydrostatic pressure of a fluid surrounding the device; the means for generating a pressure in the chamber equal to the pressure to be measured comprising means for connecting said chamber to the outside.

5. Device as claimed in claim 4, wherein the seal means consist of a seal ring of resilient material mounted in a compressed condition in contact with the facing surfaces of the lateral walls, the contact pressure between the lateral walls and the seal ring being a function of the pressure to be measured, and being such as to enable the cover to be manually rotated about the case when the pressure to be measured is less than said determined value.

6. Pressure gauge of the type comprising a cup-shaped case closed at the front by a cover consisting at least partly of transparent material; a dial provided on the front with a graduated scale and disposed in the case so as to be visible through the cover; measuring means disposed in the case to measure the pressure of the external environment; a pointer mobile along the graduated scale under the control of the measuring means; the cover being mounted rotatably on the case in an axially fixed position with respect thereto, and the dial being mounted rotatably about the axis of the case and in an axially fixed position relative thereto, means being interposed between the cover and dial to make this latter angularly rigid with the cover.

7. Device as claimed in claim 6, wherein the angular connection means comprise an axial eccentric appendix extending from the inner surface of the cover through a corresponding hole in the dial.

8. Pressure gauge of the type comprising a cup-shaped case closed at the front by a cover consisting at least partly of transparent material; a dial provided on the front with a graduated scale and disposed in the case so as to be visible through the cover; measuring means disposed in the case to measure the pressure of the external environment; a pointer mobile along the graduated scale under the control of the measuring means; the cover being mounted rotatably on the case in an axially fixed position with respect thereto; a maximum indicator device supported by the cover in a position facing the dial, this latter being supported in an axially and angularly fixed position in the case, the maximum indicator device comprises a second pointer mounted on the cover by way of friction means, so that it is mobile relative to the cover and to the dial along the graduated scale thereof; and means interposed between this second pointer and the first pointer to cause the second pointer to be entrained by the first against the braking action of the friction means in the case of movements of the first pointer corresponding only to increases in the pressure to be measured relative to a previously attained maximum pressure; the friction means comprise a drum supporting the second pointer and mounted rotatably about one of its own axes in a cavity formed in the center of the inner surface of the cover; a relatively high viscosity liquid being interposed between the inner surface of the cavity and the outer surface of the drum.

* * * * *